US008353036B2

(12) United States Patent (10) Patent No.: US 8,353,036 B2
Fu et al. (45) Date of Patent: Jan. 8, 2013

(54) METHOD AND SYSTEM FOR PROTECTING CROSS-DOMAIN INTERACTION OF A WEB APPLICATION ON AN UNMODIFIED BROWSER

(75) Inventors: Rong Yao Fu, Beijing (CN); Wei Gao, Beijing (CN); Quan Yuan, Beijing (CN); Xia Tian Zhang, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 12/691,762

(22) Filed: Jan. 22, 2010

(65) Prior Publication Data

US 2010/0186089 A1 Jul. 22, 2010

(30) Foreign Application Priority Data

Jan. 22, 2009 (CN) .......................... 2009 1 0005958

(51) Int. Cl.
*G06F 21/00* (2006.01)

(52) U.S. Cl. .......................................... 726/22; 726/23
(58) Field of Classification Search ................ 726/9, 26, 726/27, 29, 22, 3, 10; 713/224, 201, 212, 713/218, 220, 223, 150; 380/200, 201, 202, 380/203, 227, 279
See application file for complete search history.

(56) References Cited

U.S. PATENT DOCUMENTS

2009/0265760 A1* 10/2009 Zhu et al. .......................... 726/3
2010/0180330 A1* 7/2010 Zhu et al. ........................ 726/10

OTHER PUBLICATIONS

F. DeKeukelaere, "SMash: secure component model for cross-domain mashups on unmodified browsers", Proceedings of 17th International Conference on World Wide Web, 2008.
C. Reis, "Improving the Security and Robustness of Modern Web Browsers", Dept. of Computer Science and Engineering, University of Washington.
R. Guo, et al., "Compoweb: a component-oriented web architecture", Proccedings of the 17th international Conference on World Wide Web, Beijing, China, 2008.
F. De Keukelaere, SMash: Secure Cross-Domain Mashups on Unmodified Browsers, IBM Research, Tokyo Research Lab, Jun. 11, 2007.

* cited by examiner

*Primary Examiner* — Brandon Hoffman
*Assistant Examiner* — Nega Woldemariam
(74) *Attorney, Agent, or Firm* — Cantor Colburn LLP; Gail Zarick

(57) ABSTRACT

A system and method for protecting cross-domain interaction of a web application on an unmodified browser. The system includes: a security framework, which is created by a browser. The security framework further includes: a component creator for creating components from a plurality of sources; and supervision module for supervising and controlling scripts/codes executed during the creation of components and invocation and interaction operations performed by various components after the creation of components.

16 Claims, 4 Drawing Sheets

METHOD AND SYSTEM FOR PROTECTING CROSS-DOMAIN INTERACTION OF A WEB APPLICATION ON AN UNMODIFIED BROWSER

CROSS REFERENCE TO RELATED APPLICATION

This application claims priority under 35 U.S.C. 119 from Chinese Patent Application 200910005958, filed Jan. 22, 2009, the entire contents of which are incorporated herein by reference.

BACKGROUND OF THE INVENTION

1. Field of the Invention

The present invention relates to Web applications, and particularly to a method and system for protecting cross-domain interaction of a web application on an unmodified browser.

2. Description of Related Art

Nowadays, in the field of web applications, mashup is becoming an important technology of web applications. The term "mashup" refers to a kind of web application with which data from more than one source can be combined into a single integration tool, to create a novel and unique web service, which has not been provided by any source yet. Compared with the service and data of a single source, mashup provides more value. An example of mashup is Google Maps. For an enterprise, using mashup can implement a combination of enterprise applications and external applications, and a combination of internal data and external data.

Mashup is an easy way to create applications, and blurs the boundary between developers and users. With mashup, users can create their applications on demand. There are some different mashup types. Some websites may expose their JavaScript APIs (Application Programming Interface), so that users may exploit it to develop powerful applications, e.g. the API of Google Maps. There is also a more flexible mashup way, such as ScissorsHands, which can cut any HTML, JavaScript, and CSS (Cascading Style Sheets) segments from different web applications, and integrate them into a new application. Besides these ways, there is also a mashup method, such as Netvibes, Google, and Yahoo, which provides a platform and many components called as widget or gadget. Users can put some or all of the components together on a platform, and develop new components under the platform's guidelines.

The implementation of mashup is based on some techniques such as dynamic HTML, JavaScript, and Ajax. Those techniques provide much flexibility to develop more powerful applications and friendlier user interfaces. However, those techniques raise security problems. Two main security problems are Cross-Site Scripting (XSS) and Cross-Site Request Forgeries (CSRF).

XSS means a web page is injected with a malicious Javascript code by a malicious attacker, so that when a user browses the page, the Javascript code embedded therein will be executed to achieve some specific goal of the malicious attacker. Thus, the malicious code may steal cookie stored in the system, access restricted information, and rewrite a part of the page. These attacks may threat users' privacy and other content providers' interests.

CSRF exploits a trusted website by counterfeiting a request from a trusted user. When a user logs on to a service, the malicious code in the service can attack the server as the server considers that the connection is from a trusted client code. The common characteristics of CSRF are in that: compromise websites that rely on a user's identity; exploit the website's trust in the user identity; and trick the user's browser into sending HTTP requests to a target site.

Unfortunately, there has not been a good solution for above mashup security problems. In particular, the hybrid nature of mashup makes a conflict between the functionality and security of a web application. Mashup may take codes, data, and contents from different hosts, thus breaking the basic web security model, which restricts a browser from accessing different hosts in one page.

The current browser security mechanisms employ the following way: either full-trust or non-trust. That is, with respect to a domain, either scripts, codes, services therein are fully trusted, or they are not trusted at all. There is proposed a security mechanism called as Same-Origin Policy (SOP) based on the restriction on browsers. SOP only allows a page to access other contents from the same domain. A Java object XMLHTTPRequest is also under the control of SOP. Although there are some methods (Ajax proxies, dynamic script tags, and browser extensions and plugins) that can avoid SOP, these methods bring more functionality along with security problems.

For the sake of security, as a default mashup model, Google encapsulates each gadget into iFrames in order to ensure a malicious code in a certain gadget cannot attack other gadgets. That model, however, restricts the communication between gadgets. Moreover, there is a restriction for iFrame on the length of transferred information. For mashup, it is inconvenient for merging different applications from various sources.

Using of the browser extensions and plugins, as another way to enhance security of mashup application, is dependent on the operation at client side to a great extent. A client user may not correctly install the browser extensions and plugins, or he may damage the functionality after installation. Thus, this is not a reliable solution.

It can be seen from the above that, in prior art, there is still no solution that can possess powerful functions and sufficient security in terms of cross-domain interaction of web applications. Current security models lead to a situation where security is often sacrificed if versatile and scalable functionality is needed. If SOP is avoided and access from a third-party component is allowed, then it will have access to everything in the current domain. Hence, there is a need in the art for a method and system that can protect cross-domain interaction of a web application on an unmodified browser, thus giving consideration to both functionality and security.

SUMMARY OF THE INVENTION

In accordance with one aspect of the present invention a system for protecting cross-domain interaction of a web application on an unmodified browser includes a security framework created by a browser. The security framework further includes: a component creator for creating components from a plurality of sources; and a supervision module for supervising and controlling (i) scripts and codes executed during the creation of components and invocation and (ii) interaction operations performed by various components after the creation of components.

In accordance with a second aspect of the present invention, a method for protecting cross-domain interaction of a web application on an unmodified browser includes the steps of: creating a security framework by a browser; creating components from a plurality of sources by the security framework; and using the security framework to supervise and control (i) scripts/codes executed during the creation of components and (ii) invocation and interaction operations performed by various components after the creation of components.

The system and method can prohibit latent malicious operations from components, and provide a security solution to monitor and control those operations, thus enhancing both functionality and security.

BRIEF DESCRIPTION OF THE DRAWINGS

The novel features believed characteristic of the present invention are set forth in the appended claims. However, the present invention itself and its preferred mode, together with further objects and advantages, will be best appreciated from the reading of the following detailed description of the illustrative embodiments taken in conjunction with the drawings, in which:

The same or similar labels designate the same or similar elements or components throughout the figures.

DETAILED DESCRIPTION OF THE PREFERRED EMBODIMENTS

The exemplary embodiments of the present invention are described below in conjunction with the accompanying figures. For clarity and simplicity, not all features of the actual implementation are described in the specification. However, it should be appreciated that many implementation-specific decisions must be made in the procedure of developing any of such actual embodiments in order to realize the particular objectives of developers, for example complying with those limiting conditions in related to systems and businesses, wherein the limiting conditions may be varied depending on the implementation. Further, it should be appreciated that although the development effort may be complicated and time-consuming, such development effort is only a routine task for those skilled in the art that benefit from this disclosure.

Moreover, it is further noted that, in order not to obscure the present invention by unnecessary details, only the apparatus structures and/or processing steps related to the scheme according to embodiments of the present invention are shown in the accompanying figures, while other details are omitted.

Although mashup is taken as the example for explaining embodiments and implementations of the present invention in the context of the specification, the solution of the present invention is also applicable to other web applications with similar features that need to perform cross-domain interaction on a browser.

Figure 1:
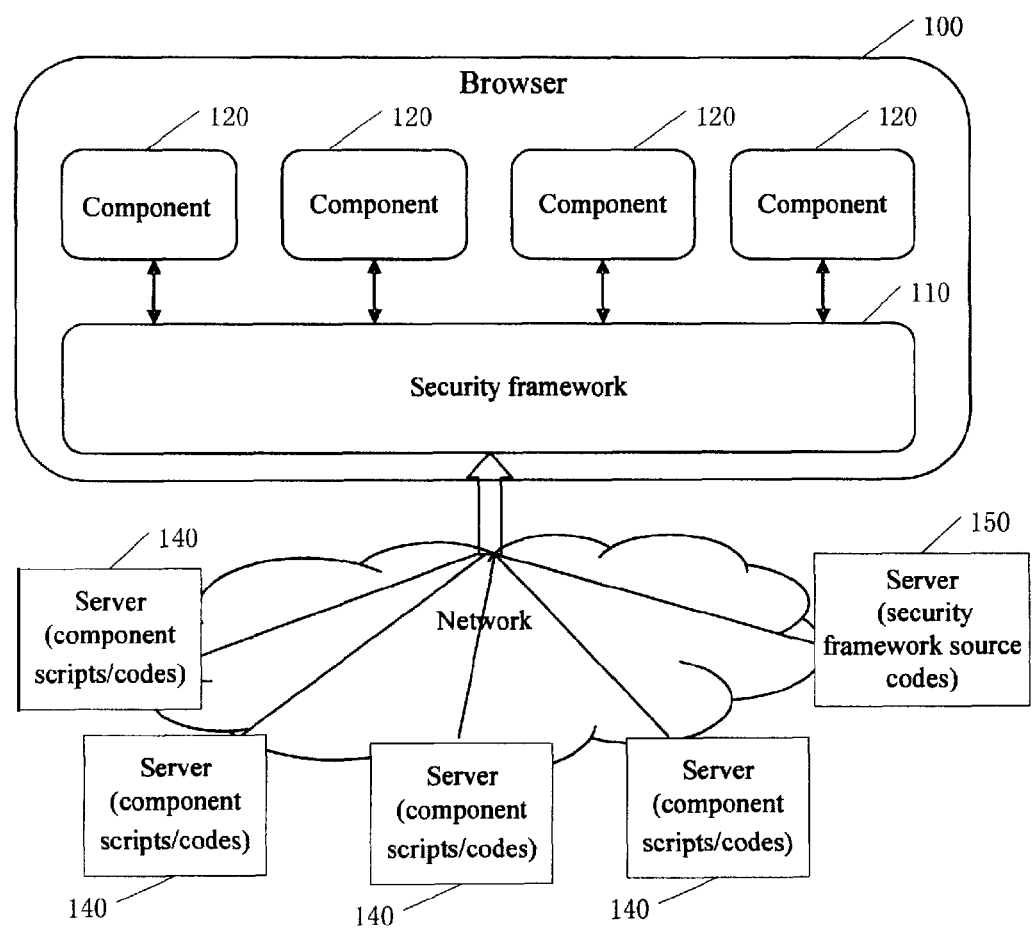
FIG. 1 is a schematic block diagram of the overall architecture and operation manner of a system for protecting cross-domain interaction of a web application on an unmodified browser according to an embodiment of the present invention.

Referring to FIG. 1, there is illustrated a schematic block diagram of the whole architecture and operation manner of a system for protecting cross-domain interaction of a web application on an unmodified browser according to an embodiment of the present invention. As shown in FIG. 1, a client browser 100 communicates with a plurality of servers 140 with component codes/scripts and a server 150 with security framework source codes via a network, which for example may be Internet or Intranet. According to an embodiment of the present invention, when the browser 100 prepares to create a component therein, it firstly requests a security framework source code (including HTML and JavaScript) from the server 150 with security framework source codes. After getting the source code, the browser 100 will run the code instantly, thereby creating a security framework 110 before creating any component. Then the security framework 110 requests and parses a component manifest file. According to the manifest file, the security framework 110 creates various components 120. Since the various components are coming from different servers 140, the security framework 110 may, based on the component to be created, obtain the codes/scripts of the component from the corresponding server 140.

The security framework 110 can provide a supervision module for supervising and controlling scripts and codes executed during the creation of components and invocation and interaction operations performed by various components in many aspects. For example, the security framework 110 can isolate every component, restrict access to DOM (Document Object Model) tree nodes by components, supervise invocations between components, supervise communications between the browser and remote resources; and filter and wrap latent dangerous objects and functions. The security framework 110 can also be used to match pre-determined security policies and/or alert users when any insecure factor occurs.

To realize the above objectives, the security framework 110 filters the source codes of a component prior to creating it, in order to eliminate or replace dangerous keywords, which can indicate objects and functions that can access DOM tree nodes or cookies, communicate with a remote server, and execute scripts. Moreover, the security framework 110 disables the initial functions of the created components, and accordingly provides a wrapped delegate function. After a component is created, it may utilize supervised and wrapped codes and functions provided by the security framework 110 to implement the access or invocation to other components or external.

Figure 2:
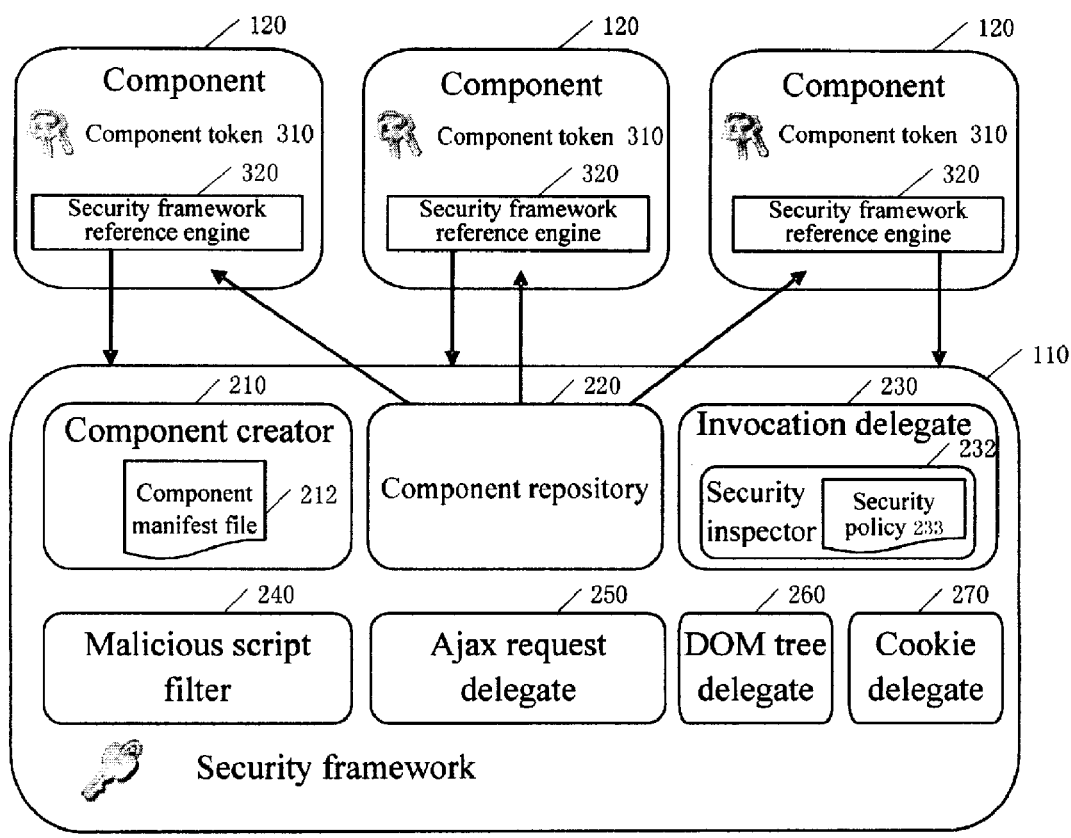
FIG. 2 is a schematic block diagram of the structure of a security framework.

Referring to FIG. 2, it is illustrated a schematic block diagram of the structure of a security framework 110 according to an embodiment of the present invention. The security framework 110 communicates with a plurality of components 120 it creates, thereby supervising and controlling their invocation and communication operations. As shown in FIG. 2, the security framework 110 may include a component creator 210, a component repository 220, an invocation delegate 230, a malicious script filter 240, an Ajax request delegate 250, a DOM tree delegate 260, and a cookie delegate 270.

In order to support the communication capabilities between components, the components should expose some functions to others. If a component can obtain an instance of another one, there may be a risk. To solve such problem, according to an embodiment of the present invention, all components must be created by the security framework 110. During the creation, the security framework 110 generates for each created component a unique random string, called as a token of the component. The security framework 110 and the component respectively hold the token as an identifier. The token is for determining the identity of the component by the security framework 110; thereby ensuring that other components cannot conduct an invocation by imitating this component. Also, references to the component can only be saved in the security framework 110, so that only the security framework 110 can invoke such references. In this way, a component with malicious codes cannot attack others.

Figure 3:
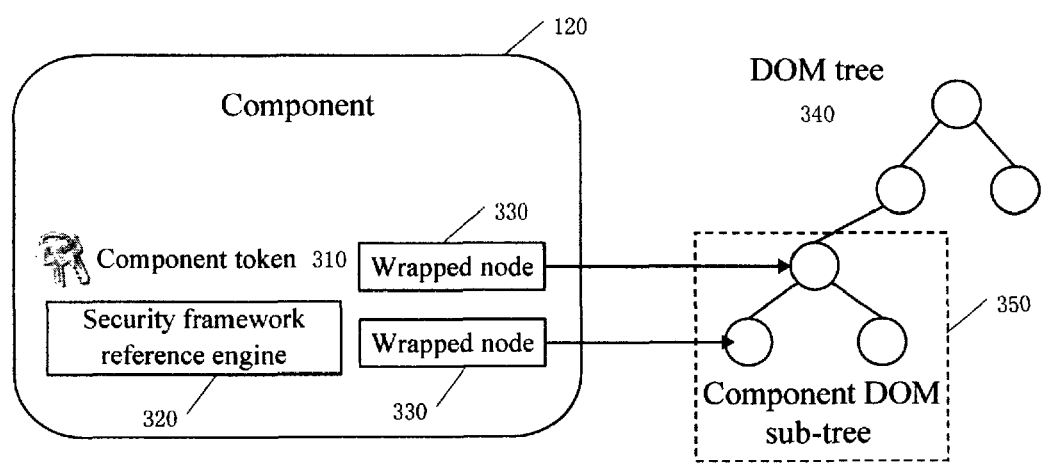
FIG. 3 is a schematic block diagram of the structure of a single component.

The component creator 210 is for creating a component according to a component manifest file 212 therein, generating for each created component 120 a random string as a token of the component, and placing the created token 310 and a security framework reference engine 320 into the component 120. The structure of the component 120 is described hereinbelow with reference to FIG. 3.

After a component 120 is created, its reference, token, host, and component name declared in the manifest file 212 are stored into the component repository 220. When a component is no use and destroyed, information relative to it will be removed from the component repository 220 by the security framework 110.

In order to support valid communication capabilities between components, the security framework 110 provides the invocation delegate 230, for monitoring and controlling external invocations between components. The invocation delegate 230 can check whether an invocation performed by a component is valid. If not, the invocation delegate 230 can deny the invocation.

When receiving an invocation from a component 120, the invocation delegate 230 firstly authenticates the caller with the token, then checks the security policy 233 by a security inspector 232 (which holds the security policy 233) in the invocation delegate 230, and decides whether to allow the invocation. If the invocation parameters provided by the invocation are valid, the invocation is allowed. Then the invocation delegate 230 locates the callee from the component repository 220, so that the component performing the invocation can perform its invoked function. If the invocation parameters provided by the invocation are invalid, or if the invocation does not comply with the security policy 233, the invocation is denied, and optionally, the user may be notified.

The function of the invocation delegate 230 for example can be in such format as:

function invoke (/*String*/caller_identifier, /*String*/target_componet, /*String*/function_name, /*Arrays*/parameters)

The function has four parameters: caller identifier (token) with a string format, target component, name of function to be invoked, and other parameters with an array format. Based on the invocation delegate 230, a component can perform invocations and communications under the supervision of the security framework 110.

It is noteworthy that, in some cases, the scripts of HTML tabs for invoking other component functions are pre-written by developers. For an example of onclick="component.execute( )", value of some parameter (such as token) for this script is not known while being written. In order to solve such problem, the developer may replace the parameter with a placeholder, and when the component is created, the security framework 110 replaces the placeholder with actual parameter value.

The Ajax request delegate 250 is for supervising and controlling Ajax requests of the components 120, thereby prohibiting direct cross-site Ajax requests. The Ajax request delegate 250 can check the scripts of a component to filter the keyword of "XMLHTTPRequest", so that the component cannot send an Ajax request directly through the object XMLHTTPRequest, thus the component 120 is only allowed to access its own host. When a component initiates an Ajax request, the Ajax request delegate 250 can check whether the target host in the request is the host that the component belongs to, i.e. whether the component and the host belong to the same domain. If so, the Ajax request may be allowed. If not, the sending of the request is denied. The checking mechanism is similar to the checking of communications between components.

In addition, compared to attacking a JavaScript object, a more popular method is to attack a page document directly. In the interaction of a web application in prior art, a malicious code can steal information from a DOM tree, and even rewrite some nodes of the DOM tree. A JavaScript script can access the DOM tree by the object document or other nodes in the DOM tree. Actually JavaScript must get the DOM tree nodes through the object document or object this in an html tag. For this reason, the security framework 110 provides the DOM tree delegate 260 for supervising and controlling access to the DOM tree by the components.

The DOM tree delegate 260 is for supervising and controlling the access to the DOM tree by the components, thereby prohibiting direct access to the DOM tree. When a component is created, the DOM tree delegate 260 may provide some wrapped DOM tree nodes to the component according to requirements of the component, while prohibiting access to other DOM tree nodes by the component, and, when required by the component, provide it with other wrapped DOM tree nodes. The wrapped DOM tree nodes have some functions for operating the real DOM tree nodes. The delegate 260 will monitor the access to the DOM tree nodes by the component, thereby prohibiting direct access to the DOM tree by the component, so as to restrict the access to the domain where the component locates.

It is noteworthy that, since the nodes provided to the component are wrapped nodes, the component cannot obtain the real nodes at all. The reason is that the component will be able to traverse any other nodes in the whole DOM tree as long as it can access a real DOM tree node. Besides getting wrapped DOM nodes using the DOM tree delegate 260, the component can also declare in its source node that it needs some pre-wrapped DOM nodes, so that the security framework 110 will provide the component with those wrapped nodes as its private parameter during the creation of the component. In this way, the component may be able to operate those nodes without retrieving them from the DOM tree delegate 260. Further, according to an embodiment of the present invention, since all components are created by the security framework 110, the security framework 110 can scan the scripts and HTML codes of the components, and eliminate the latent risky keywords (such as document, this), or notify the user after finding those keywords.

The cookie delegate 270 monitors and controls the access to cookies by the components, thereby only allowing a component to access its own cookies. Since the security framework 110 needs to filter the object document, the components cannot access cookie objects directly. Similar to the DOM tree delegate 260, the cookie delegate 270 can supervise the access to cookies by the components, thereby ensuring that a component can only access its own cookies. The cookie delegate 270 can be also used to check any network phishing link. Network phishing means: defrauding a user of personal information in a manner of e-mail, counterfeiting web pages of a financial institution, spy software, attempting to tempt the user to present sensitive information such as username, password, account ID, ATM PIN number, and credit card details, thus imitating the user identity with the stolen information.

The malicious script filter 240 is for checking scripts/codes of the components before the component creator 210 creates them, and checking scripts, HTML, CSS codes transferred between the components, in order to pick up latent malicious codes therefrom. The checking is performed by scanning a source code string for matching keywords, which can indicate the objects and functions that can access DOM tree nodes or cookies, communicate with a remote server, and execute scripts. The keywords include, but not limited to, "document", "this", "XMLHTTPRequest", "eval", "window", "location", "history", "parent", "self". If those keywords are found, they will be masked, or optionally, the user will be notified.

The reason for filtering the keyword "eval" is as follows. Including the embodiment of the present invention, the implementations of some security mechanisms are based on filtering some keywords. However, using the eval function can avoid the filtering. For example, the eval function can separate the keyword "document" into "do"+"cument", so that the filter function of a common security mechanism will become useless. Therefore, from the security perspective, the eval function is such a dangerous function. Thus, the malicious script filter 240 can scan the scripts and HTML codes for creating components and scripts and codes transferred by the components. When the keyword "eval" is found, it will be masked. Alternatively, in another embodiment of the present invention, a wrapped eval function may be provided for replacing the initial eval function, such as "framework.eval". This function can piece the separated string together, thus it is convenient for the malicious script filter 240 for checking.

Among the above five delegate components, the invocation delegate 230, the DOM tree delegate 260, and the cookie delegate 270 solve XSS risks, the Ajax request delegate 250 removes CSRF risks, and the malicious script filter 240 ensures that those security mechanisms will not be avoided. In summary, the system according to the embodiment of the present invention can prohibit any latent malicious operations from components, and provide a security solution to monitor and control those operations.

The particular description of the structure of the security framework 110 according to an embodiment of the present invention is provided hereinabove. A schematic block diagram of the structure of a single component 120 according to an embodiment of the present invention is described hereinbelow with reference to FIG. 3. A component 120 is similar to gadget and widget, which is an independent functionality unit. The component 120 may contain some HTML segments, scripts, and CSS. Different platforms may have different component development guidelines. Generally speaking, HTML and CSS describe the user interface of the component, and scripts hold the business logic of the component.

The component 120 may include a component token 310, a security framework reference engine 320, and some wrapped DOM nodes 330. The token 310 is a random identifier generated by the security framework 110 (FIG. 1) during the creation of the component 120, and is used to authenticate the caller (component) identity by the security framework 110, thereby ensuring that other components cannot conduct an invocation by imitating this one. That is, when the component 120 expects to perform an invocation, it is needed to provide its token 310, with which the security framework 110 verifies whether the component performing the invocation is a valid one.

The security framework reference engine 320 interacts with the security framework 110, for monitoring and controlling invocations and communications of the component 120, for example, invoking other components, accessing DOM nodes, making an Ajax request to its belonging host, accessing cookies, and some other functions. The wrapped DOM nodes 330 correspond to the specific DOM nodes in the DOM sub-tree 350 corresponding to the component 120 in the DOM tree 340 corresponding to the system, wherein the specific DOM nodes have some functions for operating real DOM nodes. Those specific DOM nodes 330 are necessary for the component, and are operated by the component 120. Also, the component 120 can only operate those corresponding DOM nodes. If the component 120 needs to operate another DOM node in the DOM tree, it should request the security framework 110 to get the wrapped DOM node 330 corresponding to the node, so that in the event of being permitted by the security framework 110, the component 120 can operate the DOM node. The access to the DOM tree nodes by the component will also be monitored, thereby prohibiting the direct access to the DOM tree by the component, so as to restrict the access in the domain where the component locates.

The system for protecting cross-domain interaction of a web application on an unmodified browser according to an embodiment of the present invention is illustrated hereinabove with reference to the accompanying figures. Under the same inventive concept, there is also proposed a method for protecting cross-domain interaction of a web application on an unmodified browser according to an embodiment of the present invention.

Figure 4:
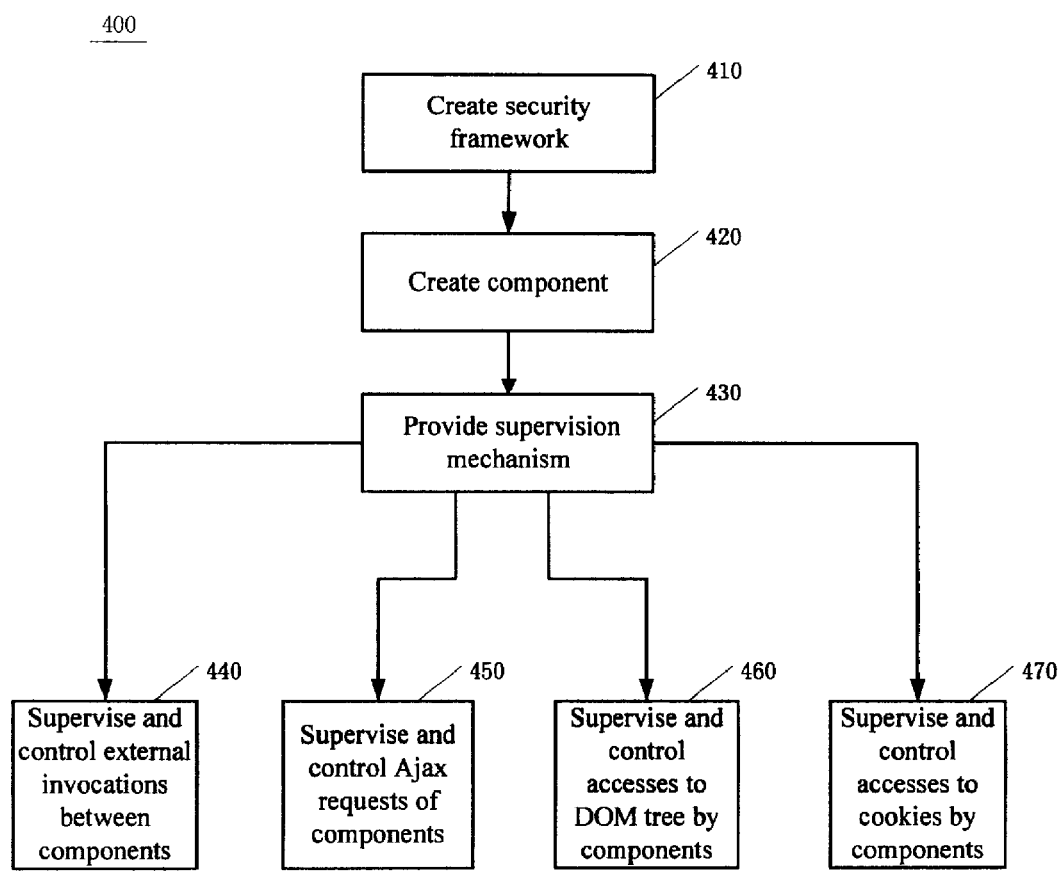
FIG. 4 is a flowchart of a method usable on an unmodified browser for protecting cross-domain interaction of a web application.

FIG. 4 illustrates a schematic flowchart of a method for protecting cross-domain interaction of a web application on an unmodified browser according to an embodiment of the present invention. The web application may include a plurality of components from a plurality of sources. As shown in FIG. 4, at Block 410, a security framework is created by a browser. In particular, the creating step further includes: requesting by the browser a security framework source code from a server with security framework source codes; and running the source code instantly, thereby creating the security framework.

After the security framework is created successfully, at Block 420, components from a plurality of sources are created by the security framework. In particular, the creating step further includes: based on a component to be created, obtaining the scripts/codes of the component from a corresponding server; generating for each created component a random string as a token of the component, the token for determining the identity of the component by the security framework; placing the created token and a security framework reference engine into the component; and storing the reference, token, host, and component name of each created component into the security framework. Furthermore, before creating the component, the security framework can check scripts/codes of the components by its provided supervision mechanism, in order to pick up latent malicious codes therefrom, wherein the checking further includes: scanning a source code string for matching keywords, which can indicate the objects and functions that can access DOM tree nodes or cookies, communicate with a remote server, and execute scripts, wherein the keywords include, but not limited to, "document", "this", "XMLHTTPRequest", "eval", "window", "location", "history", "parent", "self"; and in response to finding the keywords, masking them.

At Block 430, a supervision mechanism is provided by the security framework, for supervising and controlling scripts/codes executed during the creation of components and invocation and interaction operations performed by various components after the creation of components. The security framework may be used to match pre-determined security policies and/or alerting users when any insecure factor occurs. In particular, the supervision mechanism can further include the following:

Block 440: supervising and controlling external invocations between components, wherein the supervising and controlling further includes: verifying parameters provided by a component performing the invocation, the parameters including: caller token, target component, name of function to be invoked; allowing the component to perform the invocation in response to the parameters being valid; and denying the invocation in response to the parameters being invalid.

Block 450: supervising and controlling Ajax requests of the components, thereby prohibiting direct cross-site Ajax requests, wherein the supervising and controlling further includes: checking whether the target host in the Ajax request is the host that the component belongs to; allowing the Ajax request in response to the target host being the host that the component belongs to; and denying the Ajax request in response to the target host being not the host that the component belongs to.

Block 460: supervising and controlling the access to a DOM tree by the components, thereby prohibiting direct access to the DOM tree, wherein the supervising and controlling further includes: when a component is created, providing specific wrapped DOM tree nodes to the component, the wrapped DOM tree nodes having some functions for operating the real DOM tree nodes; prohibiting the access to other DOM tree nodes by the component; and when required by the component, providing it with other wrapped DOM tree nodes.

Block 470: supervising and controlling the access to cookies by the components, thereby only allowing a component to access its own cookies, wherein the supervising and controlling further includes: checking whether a cookie to be accessed by the component is the component's own cookie; allowing the access in response to the cookie to be accessed by the component being the component's own cookie; and denying the access in response to the cookie to be accessed by the component being not the component's own cookie.

Further, the supervision mechanism may further include the following function: checking scripts/codes of components before they are created, and checking scripts/codes transferred between components, in order to pick up latent malicious codes therefrom, wherein the checking further includes: scanning a source code string for matching keywords, which can indicate the objects and functions that can access DOM tree nodes or cookies, communicate with a remote server, and execute scripts, wherein the keywords include, but not limited to, "document", "this", "XMLHTTPRequest", "eval", "window", "location", "history", "parent", "self"; and in response to finding the keywords, masking them.

Also, the supervision mechanism may further include: providing a wrapped eval function for replacing the initial eval function, wherein the wrapped eval function can piece a separated string together, thus it is convenient for checking.

A system and method for protecting cross-domain interaction of a web application on an unmodified browser according to embodiments of the present invention are described in detail hereinabove. As appreciated by the person with ordinary skills in the art, the present invention may be embodied as a method, a system, and/or a computer program product. Therefore, the present invention can be embodied in the form of entire hardware, entire software, or the combination of software and hardware.

Additionally, the present invention may be embodied as a computer program product contained on machine-readable media where the computer executable program instructions for programming a computer system to execute the process according to an embodiment of the present invention are stored. The term "machine-readable media" used herein include any media that provide the computer system with instructions for execution. Such media may take various forms, including but not limited to: non-volatile media, volatile media, and transmission media. Non-volatile media commonly include, for example, floppy disk, floppy magnetic disk, hard disk, magnetic tape, or any other magnetic media, CD-ROM or any other optical media, slotting card or any other physical media with hole pattern, PROM, EPROM, EEPROM, flash memory, any other memory chip or cartridge, or any other media that can be read by the computer system and are appropriate for storing instructions.

A data processing system suitable for storing and/or executing program code will include at least one processor coupled directly or indirectly to memory elements through a system bus. The memory elements may include local memory employed during actual execution of the program code, bulk storage, and cache memory which provides temporary storage of at least some program code in order to reduce the number of times code must be retrieved from bulk storage during execution.

Additionally, it should be appreciated that each block in the flow chart or block chart and the combination of some blocks may be implemented by some computer program instructions. These computer program instructions may be provided to a general purpose computer, a specific purpose computer, or a processor of other programmable data processing device, to produce a machine, in which these instructions, when executed by the computers or the processor of other programmable data processing device, can create the means for implementing the functions indicated by the blocks of the block chart and/or the flow chart.

Although the present invention has been presented and described specifically by reference to the preferred embodiments, it is not intended to be exhaustive or to limit the invention to the form disclosed. Many modifications on forms and details will be apparent to those ordinary skills in the art without deviating from the spirit and scope of the invention. The embodiments were chosen and described in order to best explain the principles of the present invention, the practical application, and to enable others of ordinary skill in the art to understand the present invention for various embodiments with various modifications as are suited to the particular use contemplated.

We claim:

1. A system for protecting cross-domain interaction of a web application on an unmodified browser, the system comprising:
    a security framework created by a browser, wherein the security framework further includes:
    a component creator, configured to create components from a plurality of sources; and
    a supervision module configured to supervise and control scripts and codes executed during the creation of components, and invocation and interaction operations performed by various components after the creation of components;
    wherein the component creator is further configured to:
        obtain the scripts and codes of the component from a corresponding server, based on a component to be created;
        generate a random string for each created component as a token of the component, the token being usable for determining the identity of the component by the security framework; and
        place the created token and a security framework reference engine into the component;

wherein the security framework further comprises a component repository configured to store the reference, token, host, and component name of each created component; and wherein the supervision module further comprises an Ajax request delegate configured to supervise and control Ajax requests of the components, thereby prohibiting direct cross-site Ajax requests, the supervising and controlling further comprising checking whether the target host in the Ajax request is the host that the component belongs to, allowing the Ajax request in response to the target host being the host that the component belongs to, and denying in response to the target host being not the host that the component belongs to.

2. The system according to claim 1, wherein the browser is configured to:
request a security framework source code from a server with security framework source codes; and
run the source code instantly, thereby creating the security framework.

3. The system according to claim 1, wherein the supervision module further comprises an invocation delegate configured to supervise and control external invocations between components, wherein the supervising and controlling further comprises:
verifying parameters provided by a component performing the invocation, the parameters comprising: caller token, target component, name of function to be invoked;
allowing the component to perform the invocation in response to the parameters being valid; and
denying the invocation in response to the parameters being invalid.

4. The system according to claim 1, wherein the supervision module
is further configured to provide a wrapped eval function that replaces the initial eval function, wherein the wrapped eval function is configured to piece a separated string together.

5. The system according to claim 1, wherein the security framework is further configured to perform one or more of: matching pre-determined security policies and alerting users when any insecure factor occurs.

6. A system for protecting cross-domain interaction of a web application on an unmodified browser, the system comprising:
a security framework created by a browser, wherein the security framework further includes:
a component creator, configured to create components from a plurality of sources; and
a supervision module configured to supervise and control scripts and codes executed during the creation of components, and invocation and interaction operations performed by various components after the creation of components;
wherein the component creator is further configured to:
obtain the scripts and codes of the component from a corresponding server, based on a component to be created;
generate a random string for each created component as a token of the component, the token being usable for determining the identity of the component by the security framework; and
place the created token and a security framework reference engine into the component;

wherein the security framework further comprises a component repository configured to store the reference, token, host, and component name of each created component; and
wherein the supervision module further comprises a DOM tree delegate configured to supervise and control the access to a DOM tree by the components, thereby prohibiting direct access to the DOM tree, wherein the supervising and controlling further comprises:
providing specific wrapped DOM tree nodes to the component when a component is created, the wrapped DOM tree nodes having some functions for operating the real DOM tree nodes; and
prohibiting access to other DOM tree nodes by the component; and providing it with other wrapped DOM tree nodes when required by the component.

7. A system for protecting cross-domain interaction of a web application on an unmodified browser, the system comprising:
a security framework created by a browser, wherein the security framework further includes:
a component creator, configured to create components from a plurality of sources; and
a supervision module configured to supervise and control scripts and codes executed during the creation of components, and invocation and interaction operations performed by various components after the creation of components;
wherein the component creator is further configured to:
obtain the scripts and codes of the component from a corresponding server, based on a component to be created;
generate a random string for each created component as a token of the component, the token being usable for determining the identity of the component by the security framework; and
place the created token and a security framework reference engine into the component;
wherein the security framework further comprises a component repository configured to store the reference, token, host, and component name of each created component; and
wherein the supervision module further comprises a cookie delegate configured to supervise and control the access to cookies by the components, thereby only allowing a component to access its own cookies, wherein the supervising and controlling further comprises:
checking whether a cookie to be accessed by the component is the component's own cookie;
allowing the access in response to the cookie to be accessed by the component being the component's own cookie; and
denying the access in response to the cookie to be accessed by the component being not the component's own cookie.

8. A system for protecting cross-domain interaction of a web application on an unmodified browser, the system comprising:
a security framework created by a browser, wherein the security framework further includes:
a component creator, configured to create components from a plurality of sources; and
a supervision module configured to supervise and control scripts and codes executed during the creation of components, and invocation and interaction operations performed by various components after the creation of components;

wherein the component creator is further configured to:
  obtain the scripts and codes of the component from a corresponding server, based on a component to be created;
  generate a random string for each created component as a token of the component, the token being usable for determining the identity of the component by the security framework; and
  place the created token and a security framework reference engine into the component;
wherein the security framework further comprises a component repository configured to store the reference, token, host, and component name of each created component; and
wherein the supervision module further comprises a malicious script filter configured to check scripts/codes of components before they are created, and check scripts/codes transferred between components, in order to pick up latent malicious codes therefrom, wherein the checking further comprises:
scanning a source code string for matching keywords, which indicate the objects and functions that can access DOM tree nodes or cookies, communicate with a remote server, and execute scripts, wherein the keywords are selected from a group comprising the following: "document", "this", "XMLHTTPRequest", "eval", "window", "location", "history", "parent", "self"; and
masking the keywords in response to finding the keywords.

9. A method for protecting cross-domain interaction of a web application on an unmodified browser, the method comprising:
  creating a security framework by a browser;
  creating components from a plurality of sources by the security framework; and
  supervising and controlling scripts/codes executed during the creation of components and invocation and interaction operations performed by various components after the creation of components, wherein the supervision and control are accomplished using the security framework;
  wherein creating components by the security framework further comprises:
    obtaining the scripts/codes of the component from a corresponding server based on a component to be created;
    generating a random string for each created component as a token of the component, the token for determining the identity of the component by the security framework;
    placing the created token and a security framework reference engine into the component; and
    storing the reference, token, host, and component name of each created component into the security framework; and
  wherein supervising and controlling scripts/codes executed during the creation of components and invocation and interaction operations performed by various components after the creation of components further comprises supervising and controlling Ajax requests of the components, thereby prohibiting direct cross-site Ajax requests, wherein supervising and controlling Ajax requests of the components further comprises checking whether the target host in the Ajax request is the host that the component belongs to, allowing the Ajax request in response to the target host being the host that the component belongs to and denying the Ajax request in response to the target host being not the host that the component belongs to.

10. The method according to claim 9, wherein creating a security framework by a browser further comprises:
  requesting by the browser a security framework source code from a server with security framework source codes; and
  running the source code instantly, thereby creating the security framework.

11. The method according to claim 9, wherein supervising and controlling scripts/codes executed during the creation of components and invocation and interaction operations performed by various components after the creation of components further comprises supervising and controlling external invocations between components, and wherein supervising and controlling external invocations between components further comprises:
  verifying parameters provided by a component performing the invocation, the parameters comprising: caller token, target component, name of function to be invoked;
  allowing the component to perform the invocation in response to the parameters being valid; and
  denying the invocation in response to the parameters being invalid.

12. The method according to claim 9, wherein the supervising and controlling scripts/codes executed during the creation of components and invocation and interaction operations performed by various components after the creation of components further comprises:
  providing a wrapped eval function for replacing the initial eval function, wherein the wrapped eval function pieces a separated string together.

13. The method according to claim 9, further comprising one or more of: matching pre-determined security policies and alerting users when any insecure factor occurs.

14. A method for protecting cross-domain interaction of a web application on an unmodified browser, the method comprising:
  creating a security framework by a browser;
  creating components from a plurality of sources by the security framework; and
  supervising and controlling scripts/codes executed during the creation of components and invocation and interaction operations performed by various components after the creation of components, wherein the supervision and control are accomplished using the security framework;
  wherein creating components by the security framework further comprises:
    obtaining the scripts/codes of the component from a corresponding server based on a component to be created;
    generating a random string for each created component as a token of the component, the token for determining the identity of the component by the security framework;
    placing the created token and a security framework reference engine into the component; and
    storm the reference token host and component name of each created component into the security framework; and
  wherein supervising and controlling scripts/codes executed during the creation of components and invocation and interaction operations performed by various components after the creation of components further comprises supervising and controlling the access to a DOM tree by the components, thereby prohibiting direct access to the DOM tree, wherein supervising and controlling the access to a DOM tree further comprises:

providing specific wrapped DOM tree nodes to the component when a component is created, the wrapped DOM tree nodes having some functions for operating the real DOM tree nodes;

prohibiting the access to other DOM tree nodes by the component; and providing it with other wrapped DOM tree nodes when required by the component.

15. A method for protecting cross-domain interaction of a web application on an unmodified browser, the method comprising:

creating a security framework by a browser;

creating components from a plurality of sources by the security framework; and supervising and controlling scripts/codes executed during the creation of components and invocation and interaction operations performed by various components after the creation of components, wherein the supervision and control are accomplished using the security framework;

wherein creating components by the security framework further comprises:

obtaining the scripts/codes of the component from a corresponding server based on a component to be created;

generating a random string for each created component as a token of the component, the token for determining the identity of the component by the security framework;

placing the created token and a security framework reference engine into the component; and storing the reference token host and component name of each created component into the security framework; and wherein supervising and controlling scripts/codes executed during the creation of components and invocation and interaction operations performed by various components after the creation of components further comprises supervising and controlling the access to cookies by the components, thereby only allowing a component to access its own cookies, wherein supervising and controlling the access to cookies by the components further comprises:

checking whether a cookie to be accessed by the component is the component's own cookie;

allowing the access in response to the cookie to be accessed by the component being the component's own cookie; and denying the access in response to the cookie to be accessed by the component being not the component's own cookie.

16. A method for protecting cross-domain interaction of a web application on an unmodified browser, the method comprising:

creating a security framework by a browser;

creating components from a plurality of sources by the security framework; and supervising and controlling scripts/codes executed during the creation of components and invocation and interaction operations performed by various components after the creation of components, wherein the supervision and control are accomplished using the security framework;

wherein creating components by the security framework further comprises:

obtaining the scripts/codes of the component from a corresponding server based on a component to be created;

generating a random string for each created component as a token of the component, the token for determining the identity of the component by the security framework;

placing the created token and a security framework reference engine into the component; and storing the reference token host and component name of each created component into the security framework; and wherein supervising and controlling scripts/codes executed during the creation of components and invocation and interaction operations performed by various components after the creation of components further comprises checking scripts/codes of components before they are created, and checking scripts/codes transferred between components, in order to pick up latent malicious codes therefrom, wherein the checking comprises:

scanning a source code string for matching keywords, which indicate the objects and functions that can access DOM tree nodes or cookies, communicate with a remote server, and execute scripts, wherein the keywords are selected from a group comprising the following: "document", "this", "XMLHTTPRequest", "eval", "window", "location", "history", "parent", "self"; and masking the keywords in response to finding the keywords.

* * * * *